Nov. 27, 1923.

R. J. ELLIS 1,475,807

VEHICLE DIRECTION INDICATOR

Filed Feb. 20, 1922      2 Sheets-Sheet 1

Inventor:
R. J. Ellis.
by Hazard and Miller
Attys

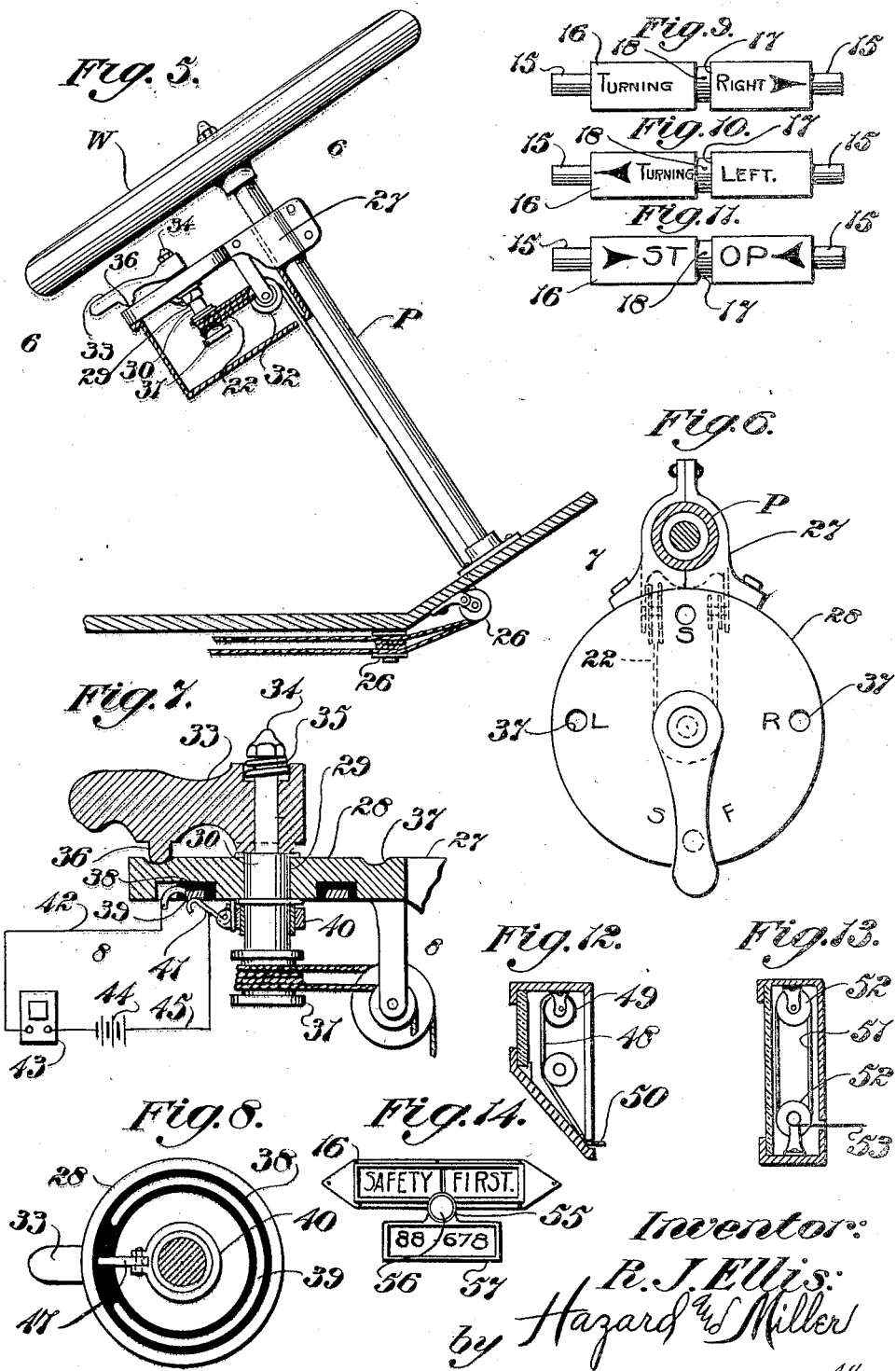

Patented Nov. 27, 1923.

1,475,807

UNITED STATES PATENT OFFICE.

ROBERT J. ELLIS, OF LOS ANGELES, CALIFORNIA.

VEHICLE DIRECTION INDICATOR.

Application filed February 20, 1922. Serial No. 537,832.

*To all whom it may concern:*

Be it known that I, ROBERT J. ELLIS, a citizen of the United States, residing at Los Angeles, in the county of Los Angeles and State of California, have invented new and useful Improvements in Vehicle Direction Indicators, of which the following is a specification.

My invention relates to a vehicle direction signal, the principal objects of my invention being to provide a relatively simple, practical and efficient signaling apparatus that is located at a point on the body of the vehicle where it is readily visible to drivers of vehicles to the rear of the vehicle on which the direction indicator is located; to provide relatively simple and effective means for actuating the movable part of the signal from a point convenient to the driver's seat, for instance, from the dash of the vehicle or from means located on the steering post or column just below the steering wheel; and, further, to provide a vehicle direction indicating device that may be easily and cheaply produced and installed.

A further object of my invention is to provide an audible signaling device that is associated with the direction indicator and which will serve to give notice in the nature of an audible signal to the driver of the vehicle that the operating handle of the mechanism has been shifted so as to move the operating parts of the mechanism in the housing on the rear of the vehicle into signaling position, thus eliminating the possibility of the parts being left in such position through oversight of the driver.

With the foregoing and other objects in view, my invention consists in the features of construction and combination and arrangement of parts hereinafter more fully described and claimed, reference being had to the accompanying drawings, in which Figure 1 is a rear elevational view of a motor vehicle showing the housing that forms a part of my improved direction signal in position upon said vehicle;

Figure 5 is an elevational view of the steering post of a vehicle showing the manually operable parts of the direction indicator in position thereupon;

Figure 6 is an enlarged section taken approximately on the line 6—6 of Figure 5;

Figure 7 is a cross section taken approximately on the line 7—7 of Figure 6 showing diagrammatically the electrical connections from certain parts of the actuating mechanism to an audible signal, such as a buzzer;

Figure 8 is a sectional view taken approximately on the line 8—8 of Figure 7;

Figures 9, 10 and 11 are elevational views of the rotary member that is located in the housing at the rear of the vehicle and which bears various direction designations;

Figures 12 and 13 are vertical sections taken through the housing of modified forms of the indicator;

Figure 14 is an elevational view of a modified form of the housing that contains the movable direction indicia bearing member and which forms a part of my improved direction indicator.

Figure 1:
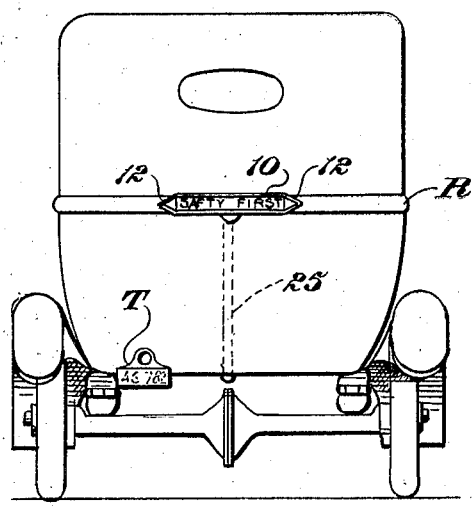
Figure 2:
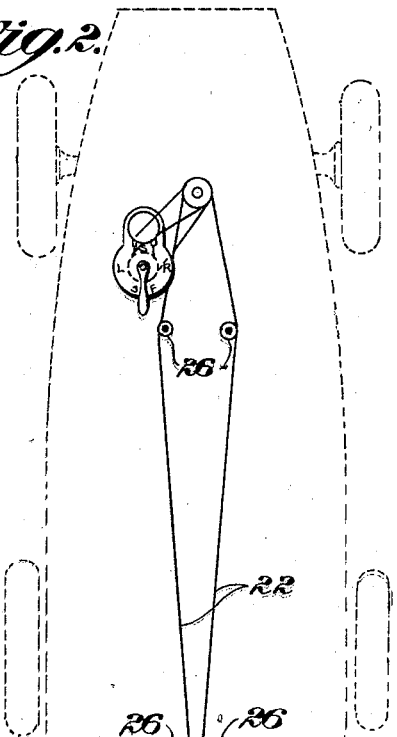
Figure 2 is a diagrammatic view of the operating connection between the housing that is located on the rear of the vehicle and the manually operative parts that are located adjacent to the driver's seat.
Figure 3:
Figure 3 is a vertical section taken lengthwise through the center of the housing of the indicator, which housing is located on the rear of a vehicle.
Figure 4:
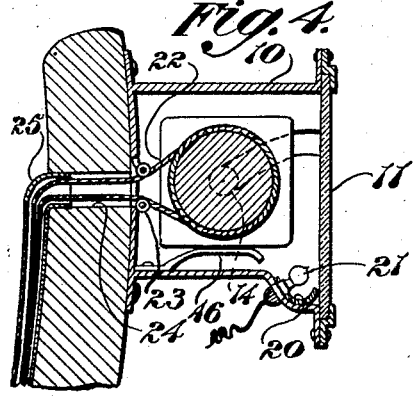
Figure 4 is a vertical section taken approximately on the line 4—4 of Fig. 3.

Referring by numerals to the accompanying drawings, which illustrate a practical embodiment of my invention, 10 designates an elongated housing, preferably constructed of sheet metal, the rear wall of which is formed of a section 11 of transparent material, preferably glass. This housing is located on the rear portion of a motor vehicle, preferably on the rail R that extends around the top of the body of the vehicle, and thus said housing is in a position where it may be readily observed. This housing may be secured to the body of the vehicle in any suitable manner and the end portions of said housing are preferably pointed, after the manner of arrow heads, as designated by the numeral 12.

Located in the ends of the housing 10 are vertically disposed brackets 13, in which are formed bearings 14 for pintles 15, which latter are seated in the ends of a rotary member 16. This rotary member is preferably constructed of wood or sheet metal, and is square or non-circular in cross section, in order to provide a plurality of faces on which may be painted or printed indicia relating to the operation and movements of a vehicle; for instance, as illustrated in Figures 9, 10 and 11, certain of the faces on the rotary member 16 may have painted or printed thereupon the words "Turning right," "Turning left" and "Stop," while another one of the faces of said member may have printed or painted thereupon the words "Safety first," which latter face is normally exposed through the transparent rear wall 11 of the housing.

Formed at the center of the rotary member 16 is a relatively narrow groove 17, thus forming a relatively short central portion 18 upon which is adapted to wind a cord or cable that is utilized for rotating the member 16 so as to expose the different faces thereof through the transparent rear wall of the housing.

The bottom of the housing 10 is provided at its center and adjacent to its front edge with a depression 19 in which is located a concave reflector 20 and positioned within said reflector is a small electric lamp 21 that may receive current from a suitable source of supply, for instance, the usual storage battery that is associated with the lighting and ignition system of the motor vehicle. This lamp and reflector provides means for illuminating the front or exposed face of the rotary member 16. If desired, the conductors to lamp 21 may lead and be connected to the conductors that are connected to the lamp within the usual tail light T.

Wound upon the cylindrical portion 18 of the rotary member 16 is a portion of a cord or cable 22 that is utilized for rotating said member from one signaling position to another and from said cylindrical portion 18 the portions of said cord or cable pass over suitably located pulleys 23 through an opening 24 that is formed in the body of the vehicle immediately to the rear of housing 10 and from said opening the sections of cord or cable extend downwardly through a tubular member 25 to a suitable point on the under side of the body of the vehicle and thence forwardly beneath said vehicle, and the sections of said cord or cable are supported by suitably located grooved wheels or pulleys 26. The means utilized for shifting the cord or cable to impart rotary movement to member 16 may be located at any point convenient to the hand of the driver of the vehicle, for instance, on the dash or upon the steering post or column immediately beneath the steering wheel, as illustrated in Figure 5. The particular form of manually operable actuating means includes a bracket 27 that is secured in any suitable manner to the steering post P a short distance below the steering wheel W, and secured to and projecting outwardly from the upper portion of said bracket is a disk 28 that has formed in its center a bearing 29 for a short rotatably arranged shaft 30. The lower portion of this shaft carries a drum 31 upon which is wound a portion of the cable 22, and from said drum said cable passes around grooved pulleys 32 that are journaled in brackets that depend from the rear portion of the disk 28 and from said pulleys the sections of cable pass downwardly through the floor of the vehicle and thence rearwardly over and around the supporting pulleys 26.

Mounted so as to rotate with and slide lengthwise upon the upper portion of shaft 30 is the hub of a short handle 33, and interposed between the top of the hub portion of said handle and a nut 34 that is seated on the top of shaft 30 is an expansive spring 35. Depending from the handle 33 is a leg or finger 36 that is adapted to engage in any one of a series of recesses such as 37 that are formed in the top of disk 28, thereby yieldingly retaining the handle in its shifted position. Appearing on the surface of disk 28 adjacent to one of these recesses are the letters "S. F.," the same corresponding to the words "Safety first" on the rotary member 16, and the cord or cable 22 that leads from the drum 31 to the rotary member 16 is arranged so that when finger 36 occupies the recess marked "S. F." the member 16 occupies a position so that the words "Safety first" are visible through the transparent rear wall of the housing. The recess on the left hand portion of the disk 28 is marked "L", and when handle 33 is turned toward the left hand so that finger 36 rests in this recess the member 16 is turned so that the words "Turning left" appear through the transparent rear wall of the housing. The recess on the right hand portion of the disk 28 is marked "R" to correspond with the words "Turning right" on the member 16, and the recess on the rear portion of disk 28 is marked "S" to correspond with the designation "Stop" on the member 16. Obviously, the arrangement and markings of the recesses 37 may be varied from those herein shown and described, but it is essential that the arrangement and connections between the drum 31 and member 16 be such that the letters or designations on the disk 28 provide an indication to show to the operator that member 16 is rotated so as to show certain direction indicia when the handle 33 is turned to a corresponding position on disk 28.

The spring 35 is effective in maintaining the handle 33 in its shifted position and at the same time permits the handle to rise slightly when the finger 36 rides out of one of the depressions 37. Seated in the under side of disk 28 is a ring 38 of insulation in which is seated an arcuate contact member 39, the same being arranged so that the space between its ends is located beneath the depression 37 that is marked "SF" and in which the finger 36 carried by handle 33 normally rests. Secured to and insulated from shaft 30 and positioned beneath disk 28 is a ring 40 to which is connected a spring arm 41, the free end of which is adapted to bear against the under face of ring 38 of insulation and against the under face of contact member 39. This arm 41 occupies a position directly beneath handle 33 so that when the latter is in its normal position with finger 36 resting in recess 37 marked "SF", the free end of arm 41 bears against ring 38 between the ends of contact ring 39.

A conductor 42 leads from ring 39 to an audible signal 43, such as a buzzer, and leading from the latter to a battery 44 and from the latter to arm 41 is a conductor 45. By virtue of the mechanism just described, the circuit to buzzer 43 will be closed whenever handle 33 is shifted in either direction a sufficient distance to move arm 41 into contact with member 39, and thus after the signal has been actuated the buzzer will continue to give an audible signal to the driver that the movable parts of the signal are in indicating position.

To yieldingly retain the rotary member 16 in its normal and shifted positions one or more flat springs, such as 46, may be arranged within the housing 10 with their free ends bearing against the flat faces of said rotary member, which springs prevent the rotary member from vibrating as a result of the travel of the vehicle over rough portions of the roadway. If for any reason the cord or cable 26 becomes inoperative or should break while the car is in service the rotary member 16 will be immediately returned to its normal position or in position to display the words "Safety first" through the transparent rear wall of the housing, such action being accomplished by a spiral spring 47 that is arranged on one of the pintles 15, one end of said spring being secured to said pintle and the opposite end of said spring being secured to the end of the member 16.

In the modified construction illustrated in Figure 12, the direction indicia may appear on the surface of a curtain-like member 48 that is adapted to wind onto and unwind from any ordinary spring-actuated roller 49 of the Hartshorne type, which curtain is unwound from said roller by a pulling movement imparted to a cord or cable 50, which latter leads to the manually operable means located on the vehicle dash or on the steering post.

In the modified construction illustrated in Figure 13, the direction indicia appear on the face of an endless flexible member 51, which is mounted upon a pair of rollers 52, one or both of which may be spring-actuated and one of said rollers being rotated by pulling movement upon a cord or cable 53 that is connected to the axis of said roller.

While I have shown and described the housing of my improved vehicle signal as being positioned on the rear portion of the body of the vehicle, it will be understood that said housing may be located on the front portion of the vehicle or upon either one of the front or rear fenders, and, further, that in some instances it may be desirable to locate a housing at both front and rear of the vehicle, and the rotary members in said housing are simultaneously actuated by the manually operated mechanism. Further, it may be found desirable to utilize but a single pull cord or cable for the operation of the rotary indicia bearing member, and when a single cord is used the manually operable means may include a lever or knob that is mounted so as to be pulled to different positions of rest toward or away from the vehicle driver.

The signal device 43 is described as being in the form of a buzzer, but other forms of signaling devices, for instance, a bell or a lamp, may be utilized for attracting the attention of the driver to the fact that the rotary member within the housing is in signaling position.

My invention, with slight modifications, may be advantageously used on street, interurban and railway cars for designating streets, stopping points and stations.

In the modified construction illustrated in Figure 14, a small housing 55 is arranged on the lower central portion of housing 10 and arranged in the front wall of said housing 55 is a colored lens 56. This lens is disposed directly in front of lamp 21, and the latter, when lighted, combines with the lens 56 in forming a tail light for the vehicle and at the same time the rays of light that project upwardly from the lamp serve to illuminate the displayed face of the indicia bearing member within the housing 10. If desired, a rectangular frame 57 may depend from housing 55, which depending frame may receive the vehicle license plate.

A vehicle direction indicator of my improved construction is comparatively simple, may be easily and cheaply produced, is positive in action, under the ready control of the driver of the vehicle, and is very effective in performing its intended functions.

It will be understood that minor changes in the size, form and construction of the various parts of my improved vehicle direction indicator may be made and substituted for those herein shown and described without departing from the spirit of my invention, the scope of which is set forth in the appended claims.

I claim as my invention:

1. A direction signal comprising a casing having a transparent side, a plurality of rotatably sustained reels in the casing, means for urging one of the reels to a definite position, a web movable over the reels and having signaling indicia thereon adapted to be exposed through the transparent side, and means for actuating the web against the action of said urging means.

2. A direction signal comprising a casing having a transparent plate removably mounted on the casing, brackets within the casing having slots closed at their outer ends by said plate, a signaling member within the casing, and stub shafts on the ends of the member and journaled in said slots.

3. A direction signal comprising a casing having a transparent plate removably mounted on the casing, brackets within the casing having slots closed at their outer ends by said plate, a signaling member within the casing, stub shafts on the ends of the member and journaled in said slots, said member being formed with a channel intermediate its ends, and means engaging the channel for effecting rotation of the member.

4. A direction signal comprising a casing having a transparent plate removably mounted on the casing, brackets within the casing having slots closed at their outer ends by said plate, a signaling member within the casing, stub shafts on the ends of the member and journaled in said slots, springs associated with the brackets and member for urging the member to a definite position, means for latching the member in an adjusted position and against the action of said springs, and means for rotating the member against the action of said latching means and said springs.

5. A direction indicator comprising a casing, a signal member rotatably mounted in the casing, said member having a plurality of angularly disposed faces bearing signaling indicia, coiled springs for normally urging the member to a definite signaling position, a leaf spring secured to the casing and engaging the member for latching the latter in any of its adjusted positions and against the action of said springs, and flexible means engaging the member for rotating the latter from a remote point.

6. A direction signal comprising a casing having a transparent side, a pair of reels rotatably sustained in the casing, a spring for urging one of the reels to a definite position, a web movable from one reel to the other, said web having signaling indicia thereon adapted to be exposed through the transparent side, and a flexible member for actuating the web against the action of said spring.

In testimony whereof I have signed my name to this specification.

ROBERT J. ELLIS.